United States Patent Office 3,379,778
Patented Apr. 23, 1968

3,379,778
HALOGENATED 1,2-BUTANEDIOLS
Rostyslaw Dowbenko, Gibsonia, Pa., assignor to Pittsburgh Plate Glass Company, Pittsburgh, Pa., a corporation of Pennsylvania
No Drawing. Filed Nov. 9, 1964, Ser. No. 409,926
3 Claims. (Cl. 260—633)

ABSTRACT OF THE DISCLOSURE

This invention relates to novel diols of the formula:

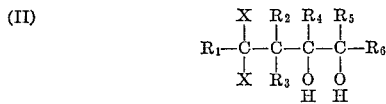

where X is selected from the group consisting of chlorine and bromine.

---

This invention relates to novel vicinal diols and to a method for their preparation. More particularly, this invention relates to novel derivatives of 4-halo-1,2-epoxy butanes. The epoxides which constitute the starting material for the process of this invention correspond substantially to the formula:

(I)
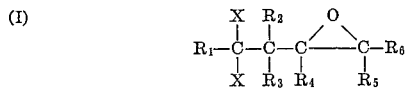

where X is a halogen (i.e., chlorine, bromine or fluorine), $R_1$ is selected from the group consisting of halogen and lower alkyl radicals, and $R_2$, $R_3$, $R_4$, $R_5$ and $R_6$ are each selected from the group consisting of hydrogen and lower alkyl radicals. A method for preparing the compounds of Formula I is disclosed in copending application, Ser. No. 228,239, filed Oct. 4, 1962, and now abandoned.

Examples of such compounds include:

4,4,4-trichloro-1,2-epoxybutane
4,4,4-tribromo-1,2-epoxybutane
4,4-dichloro-1,2-epoxypentane
4,4-dibromo-1,2-epoxyhexane
4,4,4-trichloro-1,2-epoxy-3-methylbutane
4,4,4-trichloro-1,2-epoxy-2-methylbutane
5,5,5-trichloro-2,3-epoxy-2-methylpentane It has now been found that the above compounds react with aqueous acid, opening the epoxide ring to produce diols of the formula:

(II)
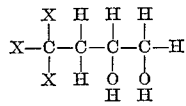

where X, $R_1$, $R_2$, $R_3$, $R_4$, $R_5$ and $R_6$ are as defined above.

Thus, for example, where the starting epoxide is 4,4-dichloro-1,2-epoxypentane, the product is 4,4-dichloro-1,2-dihydroxypentane.

It is well known in the art that epoxides, generally, may be hydrolyzed readily at room temperature in the presence of a small amount of sulfuric or perchloric acid. (See Wagner and Zook, Synthetic Organic Chemistry, John Wiley & Sons, Inc., 1953, Method 98, page 172.) However, the epoxides which are the starting material of the process of this invention are resistant to hydrolysis under these conditions, and little or no diol is formed under conditions which generally hydrolyze epoxides.

It has now been found that the epoxides of Formula I may be hydrolyzed to form the compounds of this invention, by forming a homogeneous solution of the epoxide in a water-miscible inert solvent for the epoxide and the aqueous acid, and allowing the reactants to be in contact, preferably with heating, for a substantial period of time sufficient to hydrolyze the epoxide to the corresponding diol.

The acid catalyst employed to open the epoxide ring may be sulfuric acid, phosphoric acid or perchloric acid. Preferably, the acid employed is sulfuric acid. The acid is usually employed in an amount of about 0.5 to about 5.0 mole percent of the epoxide.

Usually, an excess of water over and above the reactive amount is employed in order to promote more rapid reactions. However, as 1 mole of water reacts with each mole of epoxide, it is necessary that at least about 1 mole of water be present for each mole of epoxybutane sought to be hydrolyzed.

The solvent employed in the process of this invention can be any inert water-miscible solvent for the haloepoxybutane starting material. Examples of such solvents include, from among many known to those skilled in the art, acetone, dioxane and dimethoxyethane.

The reaction temperature employed in the process of this invention may vary widely. For example, the reaction may be carried out at ordinary room temperature (about 25° C.), although somewhat elevated temperatures are usually employed to induce faster reaction rates. Preferably, the reaction is carried out at a temperature between about 50° C. and 100° C.; however, temperatures up to about 125° C. and higher may be employed, depending on the stability of the reactants and reaction product.

The compounds of this invention may be recovered from the reaction mixture by conventional techniques known to the organic chemists. Usually, the reaction product is isolated from the reaction mixture by extracting with an appropriate water-immiscible solvent, such as diethyl ether. Any residual acid may be removed by washing with water and/or neutralization with aqueous base, such as sodium bicarbonate. The solvent layer is then evaporated and the residue distilled under reduced pressure and/or recrystallized to obtain the diols of the invention.

There are set forth below several examples which illustrate the method of producing the compounds of this invention and the manner in which such compounds were isolated and identified. These examples are, of course, given by way of illustration only, and should not be construed as limiting the invention to the particular details thereof. All parts and percentages set forth, as is true throughout this specification, are by weight unless otherwise specified.

EXAMPLE I 4,4,4-trichloro-1,2-butanediol

A mixture of 17.55 grams (0.10 mole) of 4,4,4-trichloro-1,2-epoxybutane, 50 milliliters of acetone, 10 milliliters of water and 1.0 milliliter of concentrated sulfuric acid was allowed to stand at room temperature for 5 days. It was then neutralized with potassium carbonate and the resulting mixture was extracted with ether. The ether extract was washed with water, dried with magnesium sulfate and evaporated to obtain 20.0 grams of residue. The residue was then distilled to obtain 5.57 grams of a fraction, boiling point 48° C.–100° C. (0.05 millimeter of mercury), $n_D^{25}$ 1.4698 and 8.27 grams of a fraction, boiling point 100° C.–105° C. (0.05 millimeter of mercury), which crystallized on standing. The latter was redistilled to obtain 5.78 grams of a liquid which crystallized, melting point 55° C.–61° C. Several recrystallizations from a mixture of benzene and petroleum hexanes gave the analytic sample of the butanediol of the title, melting point 65° C.–66° C., showing bands at 2.96, 3.03 and 3.11 microns, transparent from 3.6 to 6.8 microns in the infrared.

*Analysis.*—Calculated for $C_4H_7Cl_3O_2$: C, 24.83; H, 3.65; Cl, 54.98. Found: C, 24.73; H, 3.65; Cl, 55.10.

EXAMPLE II

A mixture of 702 grams (4.00 moles) of 4,4,4-trichloro-1,2-epoxybutane, 2 liters of acetone, 400 milliliters of water and 40 milliliters of concentrated sulfuric acid was refluxed (62° C.) for 13 hours, then distilled until 2 liters of distillate was collected and the temperature of the reaction mixture rose to 91° C. After 2.5 hours at 91° C. the mixture was dissolved in ether and the resulting ether solution was washed with water, sodium bicarbonate solution and water again, and this was dried. The dried solution was evaporated on the steam bath and the residue distilled to obtain the following fractions: (1) boiling point 35° C.– 96° C. (0.2 millimeter of mercury), 32.8 grams; (2) boiling point 96° C.–111° C. (0.2 millimeter of mercury), 656.6 grams (85 percent), and (3) boiling point 111° C.–195° C. (0.2 millimeter of mercury), 36.4 grams (strong hydroxyl band at 2.9 microns, medium band at 5.75 microns, weak band at 6.13 microns in the infrared, Cl, 54.3 percent). Fraction 2 crystallized on standing. It consisted mostly of 4,4,4-trichloro-1,2-butanedoil which was suitable for further use.

In a similar manner where the starting epoxide is 4,4-dichloro-1,2-epoxypentane, the product will be 4,4-dichloro-1,2-dihydroxypentane. Likewise, 4,4,4-tribromo-1,2-epoxybuetane will yield 4,4,4-tribromo-1,2-dihydroxybutane; 4,4-dibromo-1,2-epoxyhexane will yield 4,4-dibromo - 1,2 - dihydroxyhexane; and 4,4,4-trichloro-1,2-epoxy-3-methylbutane will yield 4,4,4-trichloro-1,2-dihydroxy-3-methylbutane.

The compounds of this invention contain two hydroxy groups and therefore find utility similar to other known diols. The compounds of the invention may be used as polar solvents. Likewise, these compounds are useful chemical intermediates. For example, the compounds of this invention may be reacted with acrylyl chloride or methacrylyl chloride to produce unsaturated monomers which may be homopolymerized or copolymerized with other unsaturated monomers, such as ethyl acrylate, methyl methacrylate or styrene, to produce polymers which are useful as decorative and protective coatings for wood and metal.

In addition, the diols of this invention, especially since they contain halogen atoms, find utility in polyester resins, the halogen atoms contributing fire retardant properties. For example, the compounds of this invention may be reacted, either alone or together with other diols such as ethylene glycol, diethylene glycol and propylene glycol, with dibasic acids such as maleic anhydride or phthalic anhydride to form polyester resins.

Although specific examples of the invention have been set forth, it is not intended to limit the invention solely thereto, but to include all of the variations and modifications falling within the scope of the appended claims.

I claim:
1. A compound of the formula:

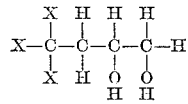

where X is selected from the group consisting of chlorine and bromine.
2. 4,4,4-trichloro-1,2-butanediol.
3. 4,4,4-tribromo-1,2-butanediol.

References Cited

UNITED STATES PATENTS

| | | | |
|---|---|---|---|
| 2,086,077 | 7/1937 | Groll et al. | 260—633 X |
| 2,321,037 | 6/1943 | Marple et al. | 260—633 |
| 2,861,084 | 11/1958 | Starcher et al. | 260—633 X |

OTHER REFERENCES

Walborsky et al.: Jour. Or. Chem., vol. 27, pp. 2387–90 (1962).

Mazur et al.: Jour. Amer. Soc., vol. 81 (1959), p. 4396.

Dowbenko: Chemistry and Industry (3, 2), August 1965, pp. 1425–26.

LEON ZITVER, *Primary Examiner.*

H. MARS, *Assistant Examiner.*